UNITED STATES PATENT OFFICE.

GADIENT ENGI, OF BASEL, SWITZERLAND, ASSIGNOR TO SOCIETY OF CHEMICAL INDUSTRY IN BASLE, OF BASEL, SWITZERLAND.

HALOGEN DERIVATIVES OF GALLOCYANIN DYESTUFFS AND PROCESS OF MAKING SAME.

1,199,458.     Specification of Letters Patent.     Patented Sept. 26, 1916.

No Drawing.     Application filed November 10, 1915. Serial No. 60,713.

*To all whom it may concern:*

Be it known that I, GADIENT ENGI, a citizen of the Swiss Republic, and resident of Basel, Switzerland, have invented new and useful Halogen Derivatives of Gallocyanin Dyestuffs and a Process of Making Same, of which the following is a full, clear, and exact specification.

Nothing has been published on the direct halogenation of gallocyanin dyestuffs, with the exception of the preparation of the bromanilidooxazin employed as intermediate product for the production of nitrobromanilidooxazin-sulfonic acid and dinitrobromanilidooxazin-sulfonic acid, according to Example 1 of the German Patent No. 92016 of April 28, 1896. More precise investigations have shown that the process (treatment with bromin in alcohol) described in the said Letters Patent for the preparation of bromanilidooxazin is, generally spoken, not suitable for the manufacture of halogen derivatives of gallocyanin dyestuffs, since it does not allow to introduce into the technically important gallocyanins, as for instance, gallocyanin, gallamin-blue, celestine-blue, etc., a quantity of halogen sufficient to change the properties of the gallocyanin.

Now I have found that the most of the gallocyanin dyestuffs can be transformed into new halogen derivatives by their treatment with a suitable halogenating agent, as for instance, sodium bromid or bromin, in concentrated sulfuric acid, the said halogen derivatives being valuable chromium dyestuffs essentially and advantageously distinguished from the parent materials. The new halogen derivatives or better their easily soluble leuco compounds obtained according to known methods yield, when employed for printing or dyeing according to the methods used for gallocyanin-dyestuffs, more bluish and more fast shades than those obtained with the gallocyanins employed as parent materials.

The process is explained by the following examples:

Example 1: 20 grams gallamin-blue (condensation product of nitrosodimethylanilin with gallamic acid) are intimately mixed with 40 gr. calcined sodium bromid and the obtained mixture is poured in the course of 1 to 2 hours below 0° C. and while stirring into 400 gr. sulfuric acid of 97%. The stirring is then continued while the vessel is cooled by melting ice surrounding the same for 12 to 15 hours and hereafter the mass heated in the course of 3 hours to 50° C. and finally still stirred at this temperature for 6½ hours. The reaction mass is cooled down and let to flow into 2 liters water, while stirring the latter, and the dissolved brominated gallamin-blue is salted out or precipitated by neutralizing with soda lye while cooling down and isolated by filtration, washing successively with a solution of salt and with water and drying. The brominated gallamin-blue is thus obtained with very good yields in the form of a dark brown-violet powder with a bronze luster. Its reactions are indicated comparatively with those of the gallamin-blue in the following tabular exhibit:

| Dyestuff. | Solution in concentrated hydrochloric acid. | Solution in concentrated sulfuric acid. | Solution in fuming sulfuric acid of 24%. | Solution in alcohol. | Solution in nitrobenzone. | Solution in toluene. |
|---|---|---|---|---|---|---|
| Brominated gallamin-blue obtained according to Example 1. | Brown-red | Brown-violet | Dirty yellow-brown. | Violet | Blue-violet. | Violet-red. |
| Gallamin blue | Bordeaux red | Pure blue | Brown red | Blue | Greenish blue. | Gray-blue. |

The proportions, concentrations, temperatures, etc., indicated in the foregoing example can be varied within large limits.

The conversion of the new bromin derivative into its leuco compound can be effected, for instance, as follows: 10 parts brominated gallamin blue are poured while stirring into 300 parts water and 20 parts concentrated hydrochloric acid, the stirring is continued for several hours at ordinary temperature; the mass is heated in the course of ½ hour to 50° C. and thereafter 5 parts of zinc dust are introduced into the same, while stirring, in the course of 1 hour, and the reaction mass further stirred for ½ hour at 50–55° C., filtered and the residue remaining on the filter is washed with water. The filtered liquid thus obtained is cooled down and the leuco compound of the brominated gallamin blue precipitated by addition of 100 parts common salt in the form of small green-yellow crystals which are separated by filtration, washed with a small quantity of water or of an aqueous solution of common salt and dried. The new leuco compound is thus obtained with nearly quantitative output in form of a greenish yellow powder very easily soluble in organic acids and showing all qualities required from a dyestuff to be printed with chromium. When printed with chromium acetate, it yields tints similar to those obtained with the brominated gallamin blue itself, but much deeper than these latter, namely a deep blue which, besides of the difference of shade, shows a much better fastness, particularly to light, than the gallamin blue employed as parent material, which, printed in analogous manner, gives pronounced violet tints.

Instead of starting in the foregoing example from the achieved brominated gallamin blue, the solution or suspension obtained according to Example 1 by pouring the reaction mass into water can be submitted to the reduction. The indicated conditions for the reduction can be varied in various directions; thus the reduction can also be effected at ordinary temperature.

Example 2: If celestine blue (condensation product of nitrosodiethylanilin with gallamic acid) is brominated according to the process described in Example 1, a brominated dyestuff is obtained which is distinguished by its reactions from those of the celestine blue as indicated in the following tabular exhibit:

| Dyestuff. | Solution in concentrated sulfuric acid. | Solution in fuming sulfuric acid of 24%. | Solution in alcohol. | Solution in nitrobenzene. | Solution in toluene. |
| --- | --- | --- | --- | --- | --- |
| Brominated celestine blue. | Gray-blue. | Dirty yellow-olive. | Violet-blue. | Pure blue. | Violet red. |
| Celestine blue. | Violet-blue. | Brown-red. | Blue. | Violet-blue. | Violet-blue. |

By printing the brominated celestine blue or its leuco compound with chromium mordants pure blue tints are obtained which are much greener than those obtained with the celestine blue itself and are further distinguished from these latter by an improved fastness namely to light.

Example 3: 10 parts gallamin blue are introduced into a mixture of 200 parts concentrated sulfuric acid and 15 parts bromin in the course of 2 hours and while stirring at —5° C.; the mass is cooled by melting ice and further stirred for 12 to 15 hours, then heated to 50° C. in the course of 1 hour, and maintained at about 50° C. for 3 to 6 hours while stirring. After cooling the mass is poured into water and the bromo derivative is salted out or precipitated by neutralizing with soda lye, filtered off, washed and dried. The bromo derivative thus obtained in the form of a green-black powder gives directly or after its transformation into the corresponding leuco compound considerably bluer prints than those obtained with gallamin blue.

The following table shows the reaction of some further bromo derivatives comparatively to the gallocyanins employed as parent materials:

| Dyestuff. | Solution in concentrated sulfuric acid. | Solution in fuming sulfuric acid of 24%. | Tint of the prints and dyeings. |
| --- | --- | --- | --- |
| Bromo derivative of the ordinary gallocyanin (prepared according to Example 1). | Greenish blue. | Dirty brown-red. | Deep blue. |
| Ordinary gallocyanin (derived from nitrosodimethylanilin and gallic acid). | Violet-blue. | Brown. | Blue-violet. |
| Bromo derivative of the gallocyanin derived from nitrosodiethylphenetidin and gallamic acid. | Gray-blue. | Dirty yellow-brown. | Pure blue. |
| Gallocyanin derived from nitrosodiethylphenetidin and gallamic acid. | Violet-blue. | Brown-red. | Violet. |

Instead of the parent materials indicated in the foregoing examples can also be subjected with the same success to the halogenation the leuco derivatives of the said gallocyanins as well as the various other gallocyanins or leuco-gallocyanins. Instead of bromin chlorin or other chlorinating agents may be employed with the same success.

What I claim is:

1. The described process for the manufacture of halogenated gallocyanin dyestuffs, consisting in treating a gallocyanin with a halogenating agent.

2. The described process for the manufacture of halogenated gallocyanin dyestuffs consisting in treating a gallocyanin with a halogenating agent in presence of a solvent.

3. The described process for the manufacture of halogenated gallocyanin dyestuffs consisting in treating a gallocyanin with a halogenating agent in presence of concentrated sulfuric acid.

4. The described process for the manufacture of halogenated gallocyanin dyestuffs consisting in treating a gallocyanin with a halogenating agent and subjecting the resulting halogen derivative to a reduction.

5. The described process for the manufacture of halogenated gallocyanin dyestuffs consisting in treating a gallocyanin with a halogenating agent in presence of a solvent and subjecting the resulting halogen derivative to a reduction.

6. The described process for the manufacture of halogenated gallocyanin dyestuffs consisting in treating a gallocyanin with a halogenating agent in presence of concentrated sulfuric acid and subjecting the resulting halogen derivative to a reduction.

7. The described process for the manufacture of halogenated gallocyanin dyestuffs consisting in treating a leuco-gallocyanin with a halogenating agent.

8. As new products, the described halogenated gallocyanin dyestuffs constituting intensely colored powders, dissolving in concentrated sulfuric acid with brown violet to gray-blue and greenish-blue colorations and in fuming sulfuric acid with dirty brown-red to dirty yellow-brown and dirty yellow-olive colorations and giving vivid and fast prints and dyeings according to the methods used for chromium dyestuffs.

9. As new products the described leuco compounds of halogenated gallocyanin dyestuffs, which constitute greenish yellow to gray powders, which are easily soluble in dilute organic acids, dissolve in concentrated sulfuric acid and in fuming sulfuric acid to weakly colored solutions and yield vivid and fast prints and dyeings according to the methods usually employed for chromium dyestuffs.

10. As a new article of manufacture, the described brominated gallamin blue, constituting a deep-violet powder with bronze luster, which dissolves in concentrated hydrochloric acid with brown-red coloration, in fuming sulfuric acid with dirty yellow-brown coloration, in alcohol with violet coloration and in nitrobenzene with blue-violet coloration and yields deep-blue prints and dyeings fast to washing, chlorin and light, according to the methods used for chromium dyestuffs.

11. As a new article of manufacture the described leuco compound of brominated gallamin blue, which constitute a greenish-yellow powder dissolving easily in dilute organic acids and yielding vivid blue prints and dyeings fast to washing, light and chlorin, according to the methods usually employed for chromium dyestuffs.

In witness whereof I have hereunto signed my name this 19th day of October, 1915, in the presence of two subscribing witnesses.

GADIENT ENGI.

Witnesses:
ARNOLD ZUBER,
AMAND RITTER.